Patented Feb. 20, 1951

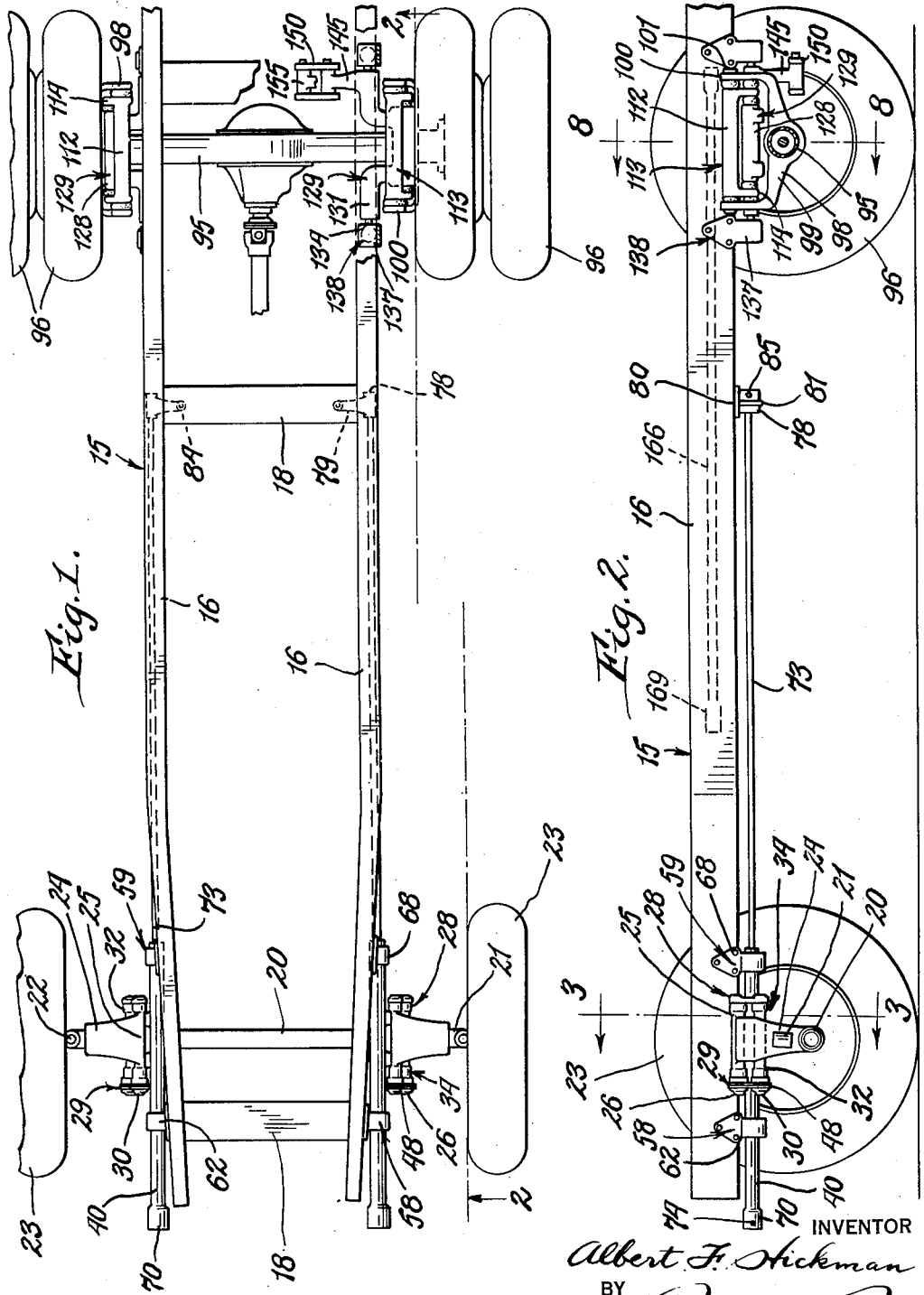

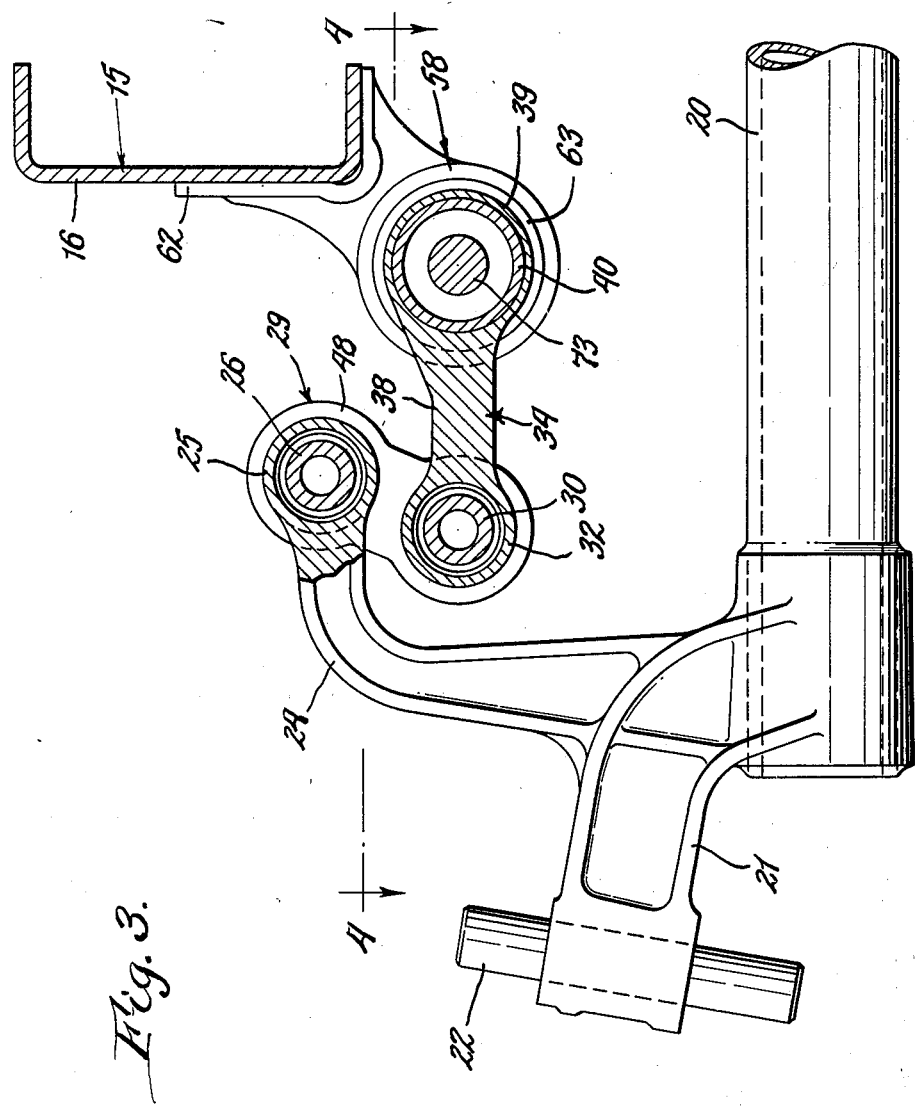

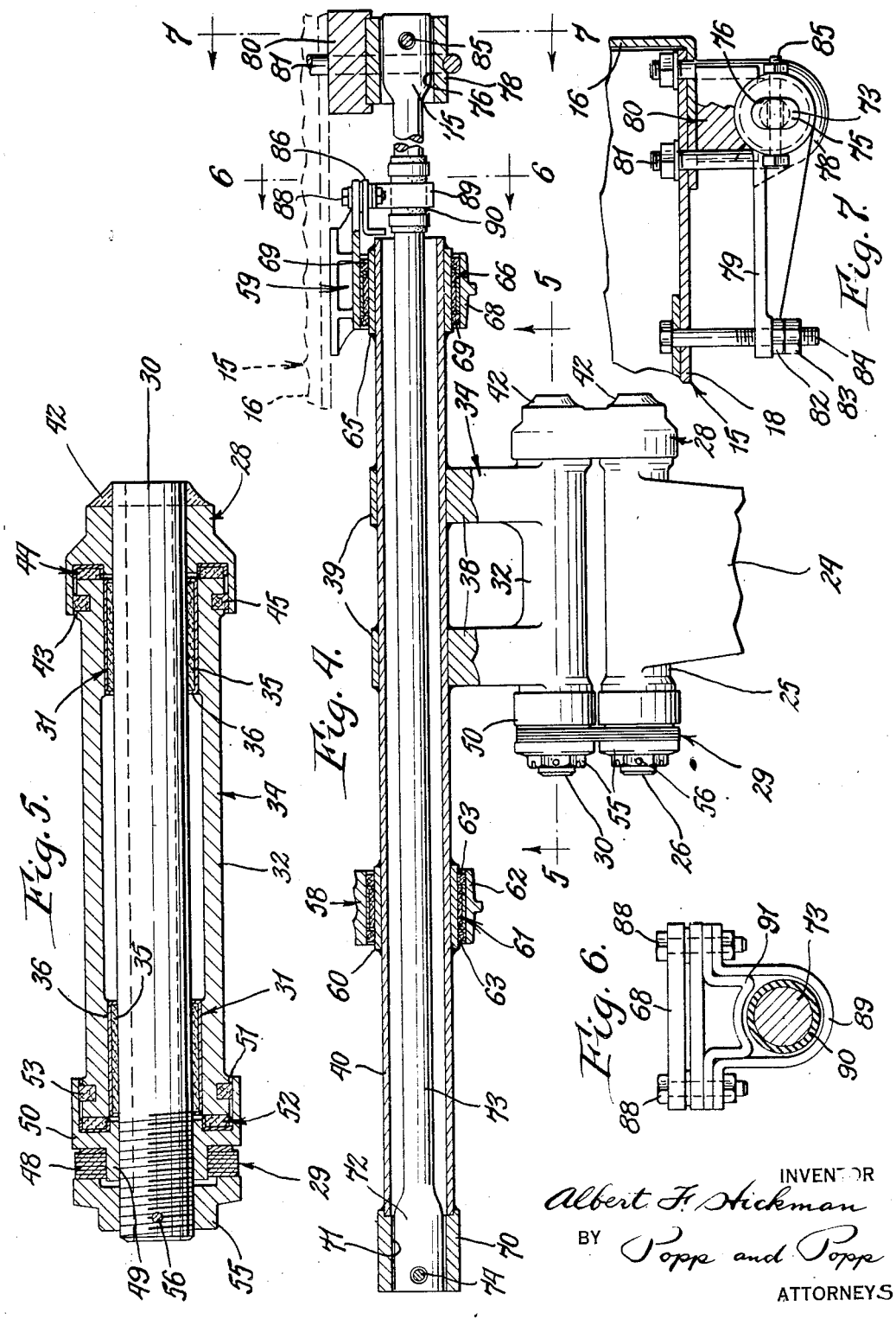

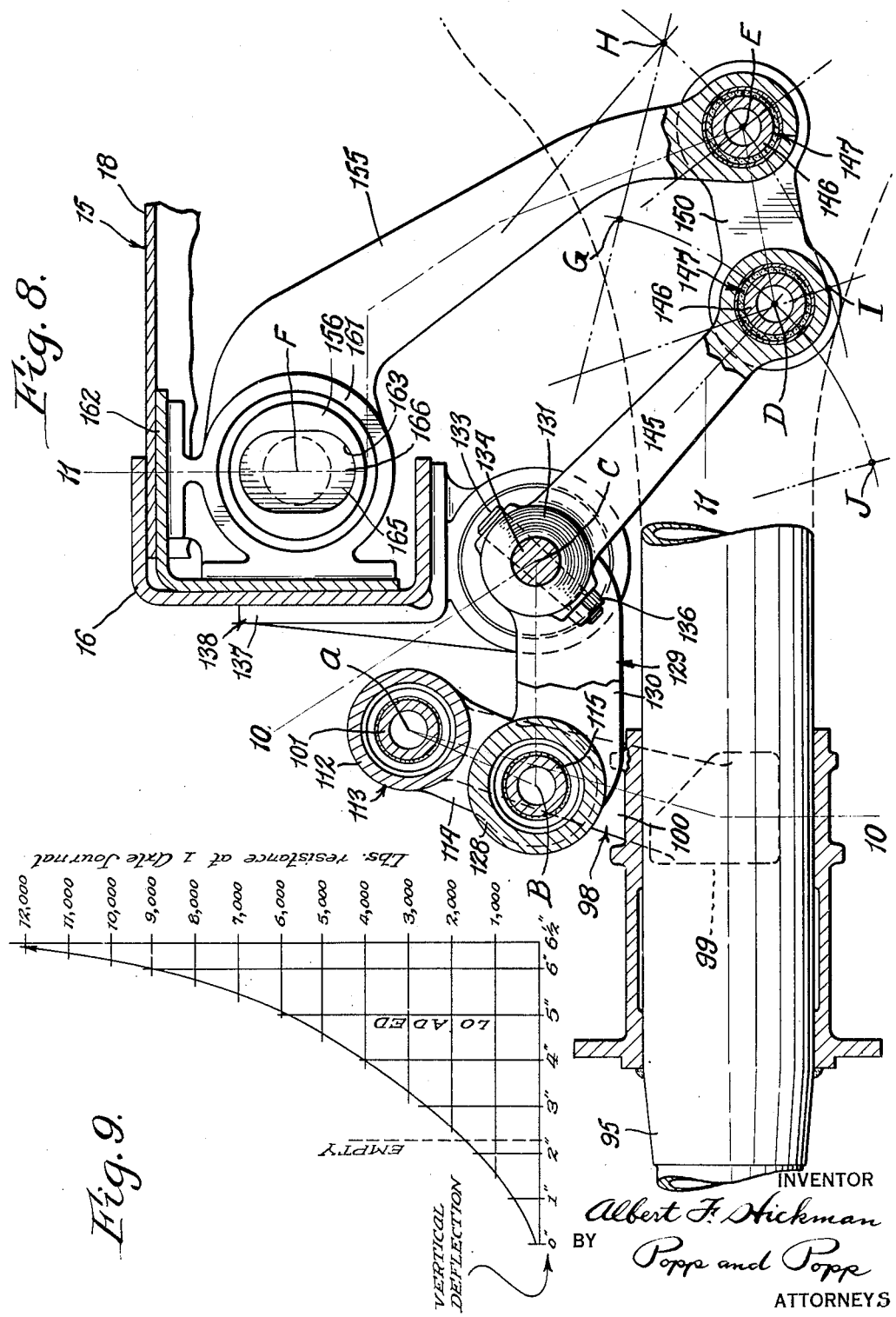

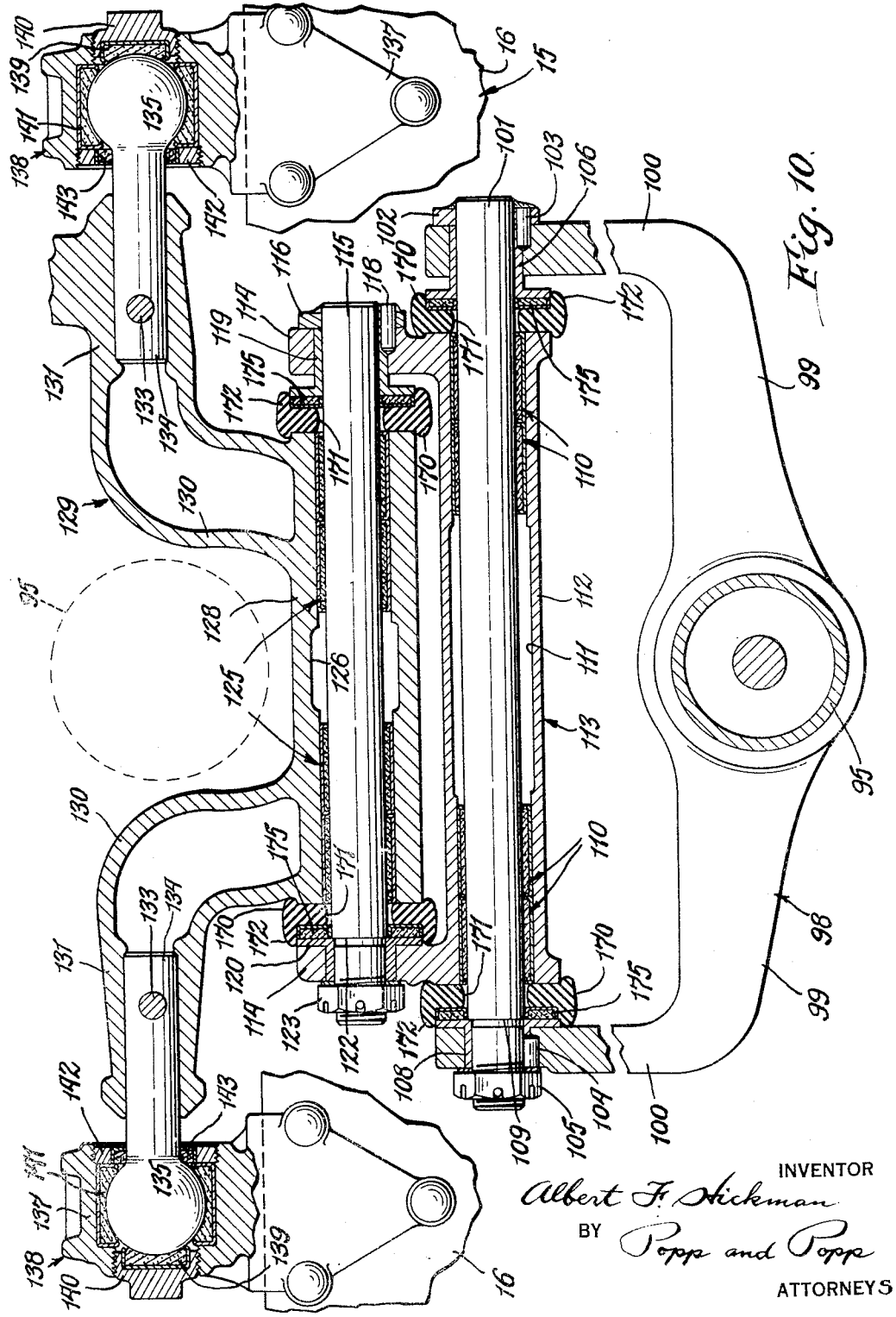

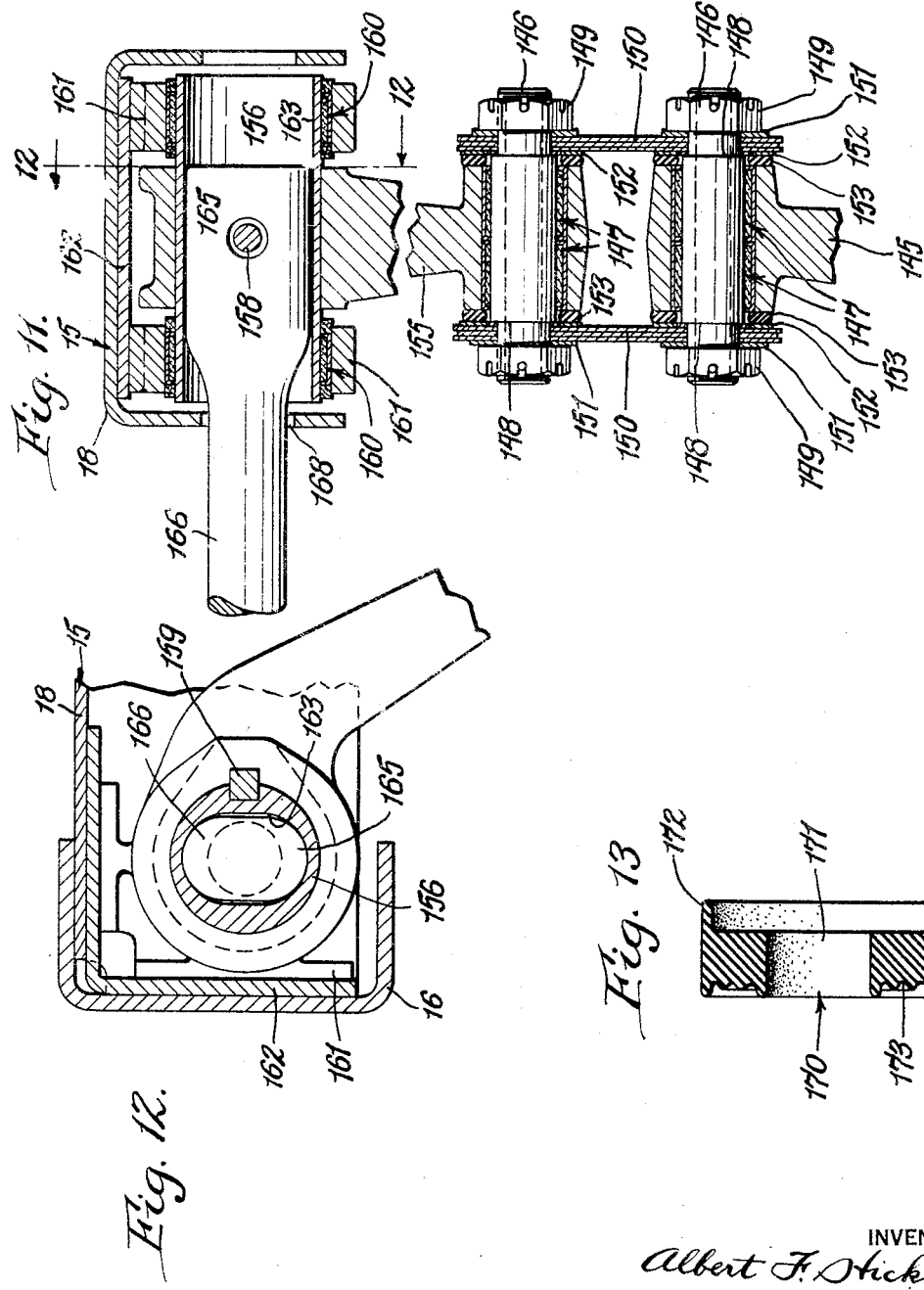

2,542,026

UNITED STATES PATENT OFFICE 2,542,026

TORSION ROD SUSPENSION FOR VEHICLES

Albert F. Hickman, Eden, N. Y., assignor to Hickman Pneumatic Seat Co. Inc., Eden, N. Y., a corporation of New York Application May 23, 1946, Serial No. 671,869

6 Claims. (Cl. 267—57)

This invention relates to a torsion rod spring suspension for vehicles and more particularly to such a spring suspension in which the axle is permitted to move against a geometric resilient resistance, both laterally and vertically, relative to the vehicle frame, particularly where the vehicle has a high percentage of local variation. While the invention is more particularly described in connection with a highway vehicle, it is also applicable for use on other land vehicles, such as railroad cars.

This application relates generally to the type of suspension shown in my Patent No. 2,245,585, granted June 17, 1941, for Vehicle Spring Suspension and is a continuation in part of my copending application Serial No. 618,917, filed Sept. 27, 1945, for Spring Suspension for Railroad Cars.

In common with my said patent important objects of the present invention are to provide a spring suspension (1) which will function to safely support the car body at high speeds, both when loaded and unloaded; (2) which reduces and cushions both the vertical and lateral impacts from the axle against the body of the vehicle, both when the vehicle is loaded and unloaded and without imposing undue end thrusts on the pivotal connections which connect the axles to the body; (3) in which torsion rods are employed to provide a longer and variable spring resistance range; (4) in which geometric resilient resistance is obtained in a compact structure which requires no lubrication and is free from the squeaks incident to the use of leaf springs; (5) in which the distribution of the load to the body is at a plurality of spaced points; (6) in which the side sway is reduced to any desired amount; (7) in which periodic vibration of the suspension is dampered out and in which wheel tramp is avoided; (8) in which all forces are cushioned so as to increase gasolene mileage and decrease tire wear; (9) which has light unsprung weight; (10) in which the metal stresses are within safe working limits of heat treated forgings or castings; (11) which can be produced at low cost and in particular requires only simple machining operations; (12) in which the parts are arranged inside of the wheels and in which the parts are located close to the wheels to provide wide pivot positions and increased stability; (13) which is adapted to the use of rubber springs in place of the metal torsion rods shown; (14) which can easily be taken down and repaired; (15) in which any desired frequency or degree of spring deflection can be obtained; (16) in which auxiliary devices for the control of side sway are rendered unnecessary; and (17) which is extremely compact and will stand up under conditions of severe and constant use with very little servicing.

A specific object of the present invention is to provide a compound leverage between the axle and vehicle body which provides a double variable spring rate.

Another specific object of the present invention is to provide spherical radial thrust bearings between the frame bracket bearings and the vehicle frame to accommodate flexing of the main lever of the suspension.

Another specific object of the present invention is to eliminate thrust bearings on the frame journal joints.

Another specific object of the invention is to provide a combined dirt seal, shock absorber and automatic bearing adjuster for each of the bearings between the axle and body of the vehicle.

Other specific objects and advantages will be readily apparent from the following description and drawings in which:

Fig. 1 is a fragmentary top plan view of the frame of a vehicle supported on front and rear axles by a torsion rod spring suspension embodying my invention.

Fig. 2 is a fragmentary vertical sectional view thereof, taken generally on line 2—2, Fig. 1.

Fig. 3 is a fragmentary enlarged vertical section taken on line 3—3, Fig. 2.

Fig. 4 is a fragmentary horizontal section taken on line 4—4, Fig. 3.

Fig. 5 is a further enlarged fragmentary horizontal section taken on line 5—5, Fig. 4.

Figs. 6 and 7 are further enlarged fragmentary vertical sections taken on the correspondingly numbered lines on Fig. 4.

Fig. 8 is a fragmentary enlarged vertical section taken on line 8—8, Fig. 2.

Fig. 9 is a graph of the action of the spring suspension showing the load on each axle plotted against vertical deflection of the frame.

Fig. 10 is a fragmentary laid out section of axle bracket, shackle structure and crank arm connecting each end of the rear axle with the frame of the vehicle, this section being taken generally on line 10—10, Fig. 8.

Fig. 11 is a continuation of the laid out sectional view shown in Fig. 10 and is taken generally on line 11—11, Fig. 8.

Fig. 12 is a fragmentary section taken on line 12—12, Fig. 11.

Fig. 13 is a radial section through one of the combined dirt seal, shock absorber and automatic bearing adjuster forming part of the rear wheel suspension, this part being designated at 170.

The main frame 15 of the vehicle chassis is shown as constituted of the usual pair of longitudinal horizontal side frame bars in the form of inwardly facing channels 16 which are connected by cross bars 18. The entire vehicle chassis, together with its spring suspension, is constructed substantially symmetrically about a vertical longitudinal medial plane, and hence it is deemed sufficient to confine the following description to the one (left) side of the vehicle, it being understood that this description applies to the opposite (right) side of the vehicle. Further, the spring suspension at the front end of the vehicle is somewhat simpler in construction than the rear end, and will for that reason be described first.

The front end of the chassis is supported on a front axle 20 having wheel brackets 21 at its opposite ends each carrying the usual kingpin 22 on which the front wheels 23 are steerably supported in the usual and well known manner. As best shown in Figs. 1–4 each wheel bracket 21 is also formed to provide an upwardly extending axle bracket 24, the upper extremity of this axle bracket extending horizontally inward toward the vehicle frame 15 and being formed at its inner extremity to provide a tubular housing 25 for an axle pivot pin 26 which can be journalled therein in any suitable manner. This tubular housing 25 and the axle pivot pin journalled therein extends horizontally transversely of the axle 20 and hence lengthwise of the vehicle frame 15.

The opposite ends of each axle pivot pin 26 project from the tubular housing 25 and are connected, as best shown in Fig. 4, by shackles 28 and 29 with the corresponding ends of a crank arm pivot pin 30. As best shown in Fig. 5, this crank arm pivot pin 30 is journalled in a pair of bearings 31 in a tubular housing 32 provided at the free end of a crank arm 34. Each of the bearings 31 is preferably in the form of a bushing 35 of bearing material impregnated with lubricant and encased in a metal sleeve 36 which is pressed into the corresponding end of the bore through the tubular housing 32. The crank arm 34 is shown as being in the form of two spaced arms 38 extending inwardly from the crank arm pivot pin 30 and have cylindrical ends 39 which embrace and are welded to a tube 40 which serves as a fulcrum for the crank arm 34. This fulcrum tube 40 for the crank arm 34 is journalled on the main frame of the chassis as hereinafter described. The axes of the axle pivot pin 26, crank arm pivot pin 30 and crank arm fulcrum tube 40 are substantially parallel extending horizontally above and transversely of the front axle 20 so as to extend lengthwise of the vehicle frame.

It will be noted that the shackles 28 and 29 connecting the opposite ends of each axle pivot pin 26 with the ends of the crank arm pivot pins 30 are of different construction. Thus each shackle 28 is in the form of a forging embracing the corresponding ends of the axle pivot pin and crank arm pivot pin and welded thereto as indicated at 42. Around each of these pins 26, 30 the shackle 28 is provided with an enlarged cup-shaped cylindrical bore 43 which, as best shown in Fig. 5, fits around the corresponding end of the tubular housing for the corresponding pins 26, 30. A thrust bearing 44 is shown as secured in the inner extremity of each of these pockets 43 and as bearing against the opposing end face of the corresponding tubular housing 25, 32 for the pins 26, 30. As with the bearings 31 each of these thrust bearings 44 is preferably made of a lubricant impregnated material and is shown as being in the form of a washer held in a metal holder which in turn is pressed into the corresponding cup-shaped bore 43 of the shackle. An annular dust seal 45 is also preferably provided at the outer extremity of each of the cup-shaped bores 43.

The opposite shackle 29 is composed of a plurality of laminations 48 of spring steel each having opposite openings fitting around the hub 49 of a cup-shaped inner nut 50 which is screwed on the threaded ends of the axle pivot pin 26 and crank arm pivot pin 30. Around each of these pins 26, 30, the cup-shaped inner nut 50 is provided with an enlarged cup-shaped cylindrical bore 51 which, as best shown in Fig. 5, fits around the corresponding end of the tubular housing for the corresponding pin 26, 30. A thrust bearing 52 is shown as secured in the inner extremity of each of these pockets 51 and as bearing against the opposing end face of the corresponding tubular housing 25, 32 for the pins 26, 30. As with the bearings 31 each of these thrust bearings 52 is preferably made of a lubricant impregnated material and is shown as being in the form of a washer held in a metal holder which in turn is pressed into the corresponding cup-shaped bore 51 of the cup-shaped inner nut 50. An annular dust seal 53 is also preferably provided at the outer extremity of each of the cup-shaped bores 51.

The laminations 48 are shown as retained on the hubs or necks 49 of the cup-shaped inner nuts 50 by end nuts 55 also screwed on the threaded ends of the pivot pins 26, 30. These outer nuts 55 are shown as pinned in position, as indicated at 56. These outer nuts have marginal portions bearing axially against the opposing face of the outermost lamination 48.

The fulcrum tubes 40 for the crank arms 34 are each supported on the corresponding side beam 16 of the vehicle frame by a pair of bearings 58 and 59. For the bearing 58 the fulcrum tube 40 has welded thereto a metal bushing 60 which is fitted in the bearing 61, this bearing being preferably made of a bushing of lubricant impregnated material fitted in a metal sleeve which is in turn pressed in the bore of a bearing housing or bracket 62 which can be secured to the corresponding longitudinal side bar 16 of the chassis in any suitable manner. Preferably annular dust seals 63 are arranged on the bearing housings at opposite ends of the bearings 61.

Each bearing 59 is arranged on the opposite side of the crank arm 34 from the bearing 58 and includes a metal bushing 65 welded on the fulcrum tube and fitted in a bearing 66, this bearing also being preferably made of a bushing of lubricant impregnated material fitted in a metal sleeve which is in turn pressed in the bore of a bearing housing or bracket 68 which can be secured to the corresponding longitudinal side bar 16 of the chassis in any suitable manner. Preferably annular dust seals 69 are arranged in the bearing housings 68 at the opposite ends of the bearings 66.

A socket member 70 is welded to the forward end of each of the fulcrum tubes 40 and this socket member is provided with an oversize ovalled bore 71 in which is loosely fitted the enlarged ovalled live end 72 of a torsion rod 73. This live end of the torsion rod is also pinned to the socket member 70 by a transverse pin 74 loosely fitted in a hole extending therethrough. Each torsion rod 73 extends coaxially through the corresponding fulcrum tube 40 and has an enlarged ovalled dead end 75 loosely fitting in an enlarged ovalled bore 76 provided in an anchoring socket member 78. The opposite ovalled ends 72, 75 of each torsion rod and the ovalled sockets 71, 76 therefor are preferably formed in accordance with my Patent No. 2,213,004 granted Aug. 27, 1940 for Torsion Rod Mounting.

The dead end 75 of each torsion rod 73 is adjustably anchored against rotation and for this purpose, as best shown in Figs. 6 and 7, the anchoring socket member 78 is shown as being generally in the form of a cylinder with an integral adjusting arm 79 extending horizontally and radially therefrom as best shown in Fig. 7. The cylindrical socket member 78 is shown as held in a semi-cyclindrical groove provided in the underface of a block 80 by a U-bolt 81. This U-bolt preferably is seated in a circumferential groove in the cylindrical socket member 78 to hold it against endwise displacement and its legs preferably straddle the socket member 78 and block 80 and are anchored in the corresponding side bar 16 and adjacent cross bar 18 of the chassis frame to hold this socket member and block in position.

The free end of the adjusting arm 79 is supported by an adjusting nut 82 and lock nut 83 on the lower end of a bolt 84 which extends through this adjusting arm. The upper end of this bolt is anchored in the adjacent cross bar 18 of the chassis and it will be seen that adjusting the nuts 82, 83 up or down serves to adjust the radial position of the dead end 75 of the torsion rod and hence adjusts the normal positions of the linkage connected to the live end 72 of the crank arm as well as the normal elevation of the chassis frame 15 with reference to the ground.

A feature of the present invention resides in the elimination of thrust bearings between the frame and the crank arms and fulcrum tubes 40. Since adequate thrust bearings 44 and 52 are provided for the axle pivot pin 26 and crank arm pivot pin 30, it will be seen that all thrust longitudinally of the chassis derived from drive and brake torque reactions are carried directly to these fulcrum tubes. As long as there is any downward load on the suspension, this thrust is transmitted through the friction of the live end 72 of the torsion rod in the ovalled socket 70 to the torsion rod and from the torsion rod through the friction of its dead end 75 in the socket 78 to the anchoring block 80, thereby to eliminate the need for large thrust bearings at the frame journals for the crank arms 34. When the body is thrown upwardly so that the suspension is unloaded, any fore and aft thrust forces are carried through the torsion rods to their anchorages by the pins 74, 85 which are loose in the oversize holes in the torsion rods so as not to function normally to resist thrust. It is also desirable to have a stop at the rear end of each fulcrum tube 40 to take care of any excessive rearward thrust at the frame journal for each crank arm 34. For this purpose an L-shaped stop member 86 is shown as bolted by bolts 88 to the rear bracket or bearing housing 68 and as having its free end in position to engage the end of the corresponding fulcrum tube 40 should any such excessive thrusts develop. These bolts 88, as best shown in Fig. 6, also carry a pair of metal bands 89, 91 which encircle and support a sleeve 90 of rubber or the like and which rubber sleeve can be secured to the adjacent part of the torsion rod 73 in any suitable manner. The purpose of this support is to prevent whipping of the corresponding torsion rod 73 against the rear end of the fulcrum tube 40, the rubber sleeve 90 at the same time permitting the necessary rotary movement of the adjacent part of the torsion rod 73.

The rear end of the chassis frame 15 is supported by a drive axle housing 95 in turn supported by dual wheels 96 at its opposite ends. As best shown in Figs. 2, 8 and 10 a U-shaped axle bracket 98 is fast to each end of the axle housing 95, this axle bracket having horizontal arms 99 extending fore and aft of the rear axle housing and having upwardly extending extremities 100. These brackets are fixed to the axle housing 95 immediately inside of the drive wheels 96 and, upon reference to Fig. 8, it will be noted that these extremities slant inwardly or toward the side bars 16 of the chassis frame instead of being vertically disposed.

The upwardly extending arms or extremities 100 of each axle bracket 98 carry an axle pivot pin 101 which, as best shown in Fig. 10, has a head 102 at one end in which is welded a pin 103, this pin projecting into a groove in the adjacent axle bracket arm 100 and to prevent the axle pivot pin 101 from turning. A loose pin 104 can be provided between the opposite end of the axle pivot pin 101 and the opposite arm 100 of the axle bracket to prevent relative rotation of these parts and the axle pivot pin can be retained in position by a nut 105 threaded thereon. The headed end of the axle pivot pin 101 can be mounted in the corresponding arm 100 of the axle bracket 98 through a sleeve or bushing 106 having a radial enlargement at its inner end to provide a thrust bearing face, the thrust against this enlargement being transmitted to the head 102 of the axle pivot pin. The opposite end of the axle pivot pin is carried by a sleeve or bushing 108 having a radial enlargement at its inner end to provide a thrust bearing face, this enlargement being disposed in engagement with the adjacent arm 100 of the axle bracket 98. The threaded end of the axle pivot pin 101 which carries the nut 105 is reduced to provide an annular shoulder 109 bearing against the thrust bushing or collar 108.

Each axle pivot pin 101 carries a plurality of bearing bushings 110, each preferably being made of lubricant impregnated material held in a cylindrical metal shell. These bearing bushings are fitted in the opposite end of the bore 111 through the tubular cross part 112 of a shackle structure 113. Shackle arms 114 are integrally formed with the opposite ends of the tubular cross part 112 of the shackle structure and the opposite ends of these shackle arms carry a crank arm pivot pin 115. One end of this crank arm pivot pin 115 is provided with a head 116 in which is welded a pin 118 fitting in a groove provided in the adjacent shackle arm 114 so as to prevent the crank arm pivot pin from turning. The headed end of the crank arm pivot pin 115 is mounted in the arm through a sleeve or bushing 119, this being similar to the sleeve or bushing 106 and having a radial enlargement at its inner end to provide a thrust bearing face, the thrust against this enlargement being transmitted to the head 114 of the crank arm pivot pin. The opposite end of this crank arm pivot pin 115 is carried by a sleeve or bushing 120 having a radial enlargement at its inner end to provide a thrust bearing face, this enlargement being disposed in engagement with the adjacent shackle arm 114. The adjacent end of the crank arm pivot pin 115 is reduced to provide an annular shoulder 122 bearing against the thrust bushing or collar 120 and is threaded to receive a nut 123 which bears, through a suitable lock washer, against the outer face of the adjacent shackle arm 114.

The crank arm pivot pin 115 carries a plurality of bearing bushings 125, these bearing bushings preferably being identical with the bearing bushings 110 and being made of a lubricant impregnated material contained within a cylindrical metal shell. These bearing bushings 125 are fitted in the opposite ends of a bore 126 through the cylindrical offset portion 128 of a crank arm indicated generally at 129. While this crank arm can be made of welded tubing, it is shown as being in the form of a tubular forging or casting.

In each of these coaxial fulcrum ends 131 of the crank arm 129 is pinned, as indicated at 133, the stem 124 of a ball 135, the pins 133 preferably being tapered and held in position by nuts 136, as best shown in Fig. 8. The stems 134 are coaxial and the balls 135 are disposed axially outward from the coaxial fulcrum ends 131 of the crank arm 129 and form part of ball and socket bearings, indicated generally at 138 which fulcrum each crank arm 129 on the longitudinal side bars 16 of the chassis frame.

Each of these ball and socket bearings 138, as best shown in Fig. 8, includes a housing or casing 137 which can be secured to the side bar 16 of the chassis frame in any suitable manner and which has an axial bore extending therethrough with an enlarged threaded end adjacent the crank arm 129 and a reduced threaded end at its opposite end. In this reduced threaded end is screwed a plug 140 carrying an end thrust bearing 139 which is shown as being made of lubricant impregnated material in a metal shell and having a concave face fitting the axial end of the ball 135. The sides of the ball 135 are engaged by a bearing ring 141 made of a lubricant impregnated material encased in a metal shell and fitting the circumference of the ball 135, the metal shell of this bearing being fitted in the bore of the bearing housing 139. This bearing 141 is held in position by an externally threaded ring 142 screwed into the large threaded end of the bore through the housing 139 and a dust seal 143 is preferably interposed between this retaining ring 142 and the stem 134 of the ball 135.

As best shown in Figs. 1, 2, 8 and 10, an arm 145 is formed integrally with the fulcrum portion of each crank arm 129 at one extremity 131 thereof and normally projects downwardly and inwardly therefrom. As best shown in Figs. 8 and 11, the outer or lower end of this arm 145 is formed to provide a horizontal bore extending transversely of the axle or lengthwise of the chassis and having a shackle pin 146 journalled therein. For this purpose a pair of bearings 147 are arranged in this bore to journal the pin 146, each of these bearings preferably being made of a bushing of lubricant impregnated material encased in a cylindrical sheet metal sleeve.

The opposite ends of each pin 146 is reduced to provide an annular shoulder 148 and threaded to receive a retaining nut 149 and a laminated shackle 150 is held between each nut 149 and shoulder 148. For this purpose a wear washer 151 is provided between each nut 149 and the adjacent outer lamination of the corresponding shackle 150 and a wear washer 152 is provided between each shoulder 148 and the adjacent inner lamination of the corresponding shackle 150. To provide a dust seal for the bearings 147, a ring 153 of rubber or other soft resilient plastic material is held in a compressed condition between each inner lamination of the shackles 150 and the opposing face of the arm 145 around the pin 146.

The shackles 150 extend generally horizontally inwardly from each shackle pin 146, as best shown in Fig. 8 and the inner extremities of each pair of these shackles is pivotally secured to the lower end of an arm 155 in a similar manner. As the pivotal connection between the shackles 150 and this arm 155 is identical to the pivotal connection between these shackles and the arm 145, the same reference numerals have been employed and the description is not repeated.

Each arm 155 is substantially longer than the corresponding arm 145 and extends upwardly and outwardly from its shackle pin 146 generally parallel with the arm 145, as best shown in Fig. 8. The upper end of each arm 155 is fulcrumed on the side bar 16 of the frame 15 on an axis above and preferably slightly inward from the fulcrum axis of the arm 145. For this purpose, as best shown in Fig. 11, the upper or fulcrum end of the arm 155 is fast to a fulcrum sleeve 156 by means of a cross pin 158 and key 159. This fulcrum sleeve 156 is journalled in a pair of bearings 160 at opposite ends thereof, these bearings preferably being in the form of a sleeve of lubricant impregnated material encased in a shell and the shell of each bearing being fitted in the bore of a bearing housing 161. Each pair of bearing housings 161 is shown as secured to an L-shaped anchoring bracket 162 and one leg of this anchoring bracket 162 is secured to the adjacent web of the adjacent longitudinal channel beam 16 of the chassis frame 15 while the other leg of this anchoring bracket 162 is secured to the web of an adjacent cross channel beam 18 of the chassis frame.

Each fulcrum sleeve 156 is provided with an ovalled bore 163 in which is fitted the enlarged ovalled live end 165 of a torson rod 166, these parts being preferably formed in accordance with my said Patent No. 2,213,004. This torsion rod extends forwardly through an opening 168 provided in the adjacent side flange of the cross beam 18 and the dead end 169 can be anchored on the chassis frame in any suitable manner, these rear torsion rods 166 extending generally as shown by dotted lines in Fig. 2.

A feature of the invention resides in the form and mounting for the combined rubber dirt seal, shock absorber and automatic bearing adapter illustrated in Fig. 13. This is in the form of a ring 170 of rubber or like soft, resilient plastic material and having a concentric bore 171 somewhat larger than the enlarged parts of each axle pivot pin 101 and crank arm pivot pin 115. At one side this ring is provided with an axially extending peripheral flange 172 and its opposite side is provided with a series of concentric annular grooves or flutes 173. One of these rings 170, as best shown in Fig. 10, is fitted over each end of each crank arm pivot pin 101 and crank arm pivot pin 115 and is interposed between the tubular housing for this pin and an adjacent thrust bearing 175, each of these thrust bearings being disposed against the face of the radial enlargement of the corresponding thrust sleeve 106, 108, 119, 120. The flanges 172 of these rubber rings 170 extend over these thrust bearings to provide dust seal therefor and the body of these rings are compressed between these bearings and the adjacent ends of the tubular housings for the pins 101 and 115.

Operation

In the operation of the suspension, the upward movement of one end of the front axle 20, through its shackles 28, 29, swings the outer or offset portion 32 of its crank arm 34 upwardly, the fulcrum tube 40 of this crank arm oscillating about its bearings 58 and 59 in the bearing housings 62 and 68, respectively. This rotation of the crank arm 34 and its fulcrum tube 40 is yieldingly resisted by the torsion rod 73 which has its live end 72 ovalled and fitted in the ovalled socket member 70 fast to the front end of the corresponding fulcrum tube 40, and has its dead end 75 anchored in the socket member 78. The front torsion rods 73 thereby provide the springs for supporting the front end of the chassis frame 15.

Similarly the upward movement of one end of the rear axle housing 95, through the shackle arms 114 of the shackle structure 113, swings the outer or offset portion 128 of its crank arm 129 upwardly, this arm swinging about its ball and socket bearings 138 carried by the chassis frame. This rotation of the crank arm 129 is yieldingly resisted, through the arm 145, shackles 150 and arm 155 by the torsion rod 166 which has its live end 165 fitted in the ovalled fulcrum sleeve 156 for the arm 155 and its dead end 164 anchored in the chassis frame. The torsion rods 166 thereby provide the springs for supporting the rear end of the chassis frame 15.

It will be noted that the shackles 28, 29 are inclined upwardly and inwardly from the crank arm pivot pins 30 to the axle pivot pins 26 and that similarly the shackle arms 114 of the shackle structure 113 are inclined upwardly and inwardly from the crank arm pivot pins 115 to the axle pivot pins 101. This upward and inward inclined arrangement of these shackles tends to cause each axle to centralize itself in a direction transverse of the chassis and enables the action of gravity to geometrically and resiliently resist any such movement of the axle away from its central position. This permits the vehicle body to move substantially straight ahead despite a certain amount of lateral movement of the axle. This arrangement of the shackles further provides high and wide pivot positions which provides increased stability in that it provides effective spring centers which can be as wide or wider than the track of the vehicle. Further, this arrangement of the shackles reduces sidesway, the high and wide pivot positions, together with the upward and inward slant of the shackles, providing a suspension in which the vehicle body is more nearly suspended than mounted. Other important advantages which flow from the inclined arrangement of the shackles shown are the reduction in the possibility of wheel tramp and in the elimination of the need for anti-body-roll devices, such as torsion bar stabilizers.

When one end of the front axle 20 is so forced upwardly relative to the chassis, the effective resilient opposing force of the torsion rods 73 increases at a geometric and not at an arithmetic rate. In this particular case the geometric rate is of the accelerated increase type in which increments of vertical movement of the front axle are opposed by an accelerated rate of resilient resistance. This is primarily due to the progressive decrease in the effective leverage of the crank arms 34 as they swing upwardly and inwardly about the torsion rods 73 as axes of rotation. This action is also influenced by the varying angularity of the shackles 28, 29 and the fact that increments of vertical displacement of the pivot pins 30 cause accelerated rates of increase in the angular displacement of the torsion rods 73. This latter is due to the fact that increments of vertical movement of said pivot pins 30 are not proportional to the accompanying increments of angular twist to which their companion torsion rods 73 are subjected.

This geometric action also occurs when the front axle 20 moves downwardly relative to the chassis from the normal position shown in Fig. 3. Throughout this particular movement the geometric action is of the accelerated decrease type, that is, as the front axle passes through increments of downward movement, the rate of decrease of the resilient force tending to push the axle downwardly decreases.

By this means, so far as vertical forces are concerned, the vehicle chassis is free to "float" along solely under the influence of gravity (plus whatever vertical momentum forces are present), this feature of the invention being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and the body. Such a desirable result is quite different from that obtained from the conventional leaf spring suspension in which the axle and the rest of the unsprung weight drags or jerks down the body whenever the strains imposed on the chassis are negative. In the present front end suspension no such negative force, tending to pull the body downwardly, is possible.

Since the linkage between the rear axle 95 and the chassis frame is generally similar to the linkage between the front axle 20 and the chassis frame, it will be seen that the above discussion applies with equal force to the rear end suspension, the action of the rear end suspension being modified, however, by the use of the arms 145 and shackles 150 to connect this linkage to the torsion rods 166.

One of the principal features of the present invention resides in the action of lever 155 connected as shown in Fig. 8 to produce the performance curve shown in Fig. 9. It will be noted that the normal pivot positions of the axle pivot pin 101, crank arm pivot pin 115 and crank arm fulcrum 134 are in the same position as the corresponding parts 26, 30 and 40 of the front end suspension and hence action of the suspension from the rear axle 95 up to the crank arm 129 is the same as the action of the front end suspension from the front axle 20 up to the crank arm 34. However the arms 145 and 155 connected by the shackles 150 are not a mere relay structure leading to the torsion rod 166. In particular it will be noted that the greater length of the arm 155 as compared with the arm 145 and the arrangement of the pivots for these arms result in these arms modifying the action of the crank arm 129 instead of being merely a motion transmitting mechanism or relay to a remotely located torsion rod.

For convenience in describing this action of the rear end suspension, the pivot axis of the axle pivot pin 101 is designated in Fig. 8 at A; the pivot axis of the crank arm pivot pin 115 is designated at B; the pivot axis of the fulcrum pins 134 for the crank arm is designated at C; the pivot axis of the shackle pin 146 for the arm 145 is designated at D; the pivot axis of the shackle pin 146 for the arm 155 is designated at E; and the pivot axis of the fulcrum sleeve 156 and of the torsion rod 166 is designated at F.

With the rear end suspension constructed as shown in Figs. 10 and 11, it will be seen that when a load is applied to the frame 15 causing spring deflection, pivot C will move downward causing the effective length of the lever C, B to become shorter. Thus the lever C, B has its greatest effective length, as against vertical forces, when it is in the horizontal position shown in Fig. 8 and this effective length progressively decreases as this lever departs from this position. Since this lever arm C, B decreases in effective length, and hence has less influence on the supporting torsion rod 166, as it is displaced by a load or vertical impact on the chassis, it provides a variable rate suspension. In other words, increments of load on the chassis cause a progressively decreased spring deflection so far as the lever C, B is concerned.

It will also be seen that when this load is applied to the chassis, the effective length of the lever C, D increases as against the opposing force exerted by the shackles 150. Thus the clockwise rotation of the arm 145 under increments of load causes this arm 145 to be brought progressively more perpendicular to the line of force connecting the pivots D, E and hence the effective length of the lever C, D increases. It will also be seen that when this load is applied to the chassis, the actual distance between the point C, E decreases. Thus with the clockwise rotation of the arm 145 under load, the pivot E is drawn closer to the pivot C so that the distance between these pivot points becomes shorter.

When the chassis 15 is raised sufficiently high to completely unload the torsion rod 166 at pivot F, the pivot D at the end of the lever arm 145 moves to the position indicated at G and the pivot E at the end of lever arm 155 moves to the position indicated at H. It will be noted that in this unloaded condition of the torsion rod 166, the pivots C, D and E are in a straight line represented by the line G, H. When this straight line relationship G, H of the pivots C, D, E obtains, it will be seen that the torsion rod 166 is at infinite disadvantage to resist any force created around pivot C and acting on lever arm 145. Thus the lever arm 145 and shackles 150 have straightened out and the torsion rod 166 and lever arm 155 are incapable of resisting rotation of the lever arm 145 around the pivot C and hence this lever arm 145 is free to move. This condition is represented at the start of the curve shown in Fig. 9.

When the empty body is released from this position to load the rear torsion rods, the linkage assumes the full line position shown in Fig. 8. In this movement the pivots C, D, E move out of the straight line unloaded relation indicated by the line G, H and assume the triangular arrangement shown with the pivots C, D, E in the obtuse-angled triangle shown. In this position the torsion rod 166 no longer is incapable of resisting forces created around the pivot C since the lever arm 145 has increased its effective length from zero (its position at G) to a relatively short effective length where the line of force directed against its pivot D (represented by the axes of the shackles 150) is at obtuse angle to the plane of the pivots C, D. Because of the still relatively short effective length of the lever arm 145, and because the crank arm 129 is at its maximum effective length, the load becomes very effective on the torsion rod and the weight of the empty body, which is assumed to be 1,500 pounds on each rear spring, causes, as illustrated on the graph, Fig. 9, 2¼ inches of vertical deflection of the chassis 15 relative to the ground out of a total possible deflection of 6½ inches. This provides an empty body ride which is comparable to a full load ride.

When the chassis 15 is loaded the pivot E moves to position I and the pivot D moves to position J, as illustrated in Fig. 8. In this movement the pivots C, D, E move out of the obtuse-angled triangle shown and assume the almost right-angled triangle arrangement represented by the points C, J, I. In this position the lever arm 145 is close to its maximum effective length but the effective length of the crank arm 129, and the leverage between pivots C and E have been reduced, the crank arm 129 having been moved close to the position where the line of pressure imposed by the axle against the crank pin 115 or pivot B is able to pass through the axis or pivot C of the crank arm 129. This latter is the non-bottoming position of the linkage since when the pivots A, B and C are in straight line relationship the spring resisting the rotation of the crank arm 129 is at infinite advantage to resist upward movement of the axle. In this loaded position of the chassis the ride is comparable to the empty body ride.

The performance of the spring suspension as shown on the graph, Fig. 9 is therefore the result of the varying effective lengths of the levers connecting the axle with the torsion rod and the varying positions of the pivots of these levers. As shown on this chart the empty body, assumed to be 1,500 pounds per spring, causes 2¼ inches of spring deflection measured by the distance from the chassis to the ground. As increments of load are added, the changing effective length of the levers and changing pivot positions increasingly favors the torsion rod 166 so that with an added load on each spring of 4,500 pounds, or 300%, only 2¾ inches of added spring deflection occurs, this being represented by the intersection of the 6,000 pound line with the 5 inch deflection line on the chart. When the total load on the body increases to 9,000 pounds, representing an increase of 50% from this 6,000 pounds loaded condition, only 1 inch of additional spring deflection occurs. Further the suspension is non-bottoming since the torsion rod 166 approaches infinite advantage as the pivots A, B, C approach a straight line relation.

As a result of the double variable rate provided by the linkage connecting the crank arm 129 with the axle and the linkage connecting this crank arm with the torsion rod 166, the empty body ride is approximately the same as the full load ride, the suspension being thereby particularly advantageous in vehicles subject to a large percentage of load variation. The suspension is also particularly advantageous where top heavy loads are carried and where a minimum change in body floor heights is desired to accommodate loading platforms.

As with the front end suspension, the rear end suspension provides lateral resilience between the sprung and unsprung portions of the vehicle, through the arms of the shackle structure 113, and also adequate sidesway control. This sidesway control is due to the higher rate of spring deflection when loads are applied; the wide and high axle pivots A; the upward and inward slanting of the arms 144 of the shackle structure 113; and because the axle pivots A do not go down when loads are applied. Since these axle pivots A remain at constant height when the body goes down under load, the axle pivots rise relative to the body when a load is applied so as to improve their sidesway control under loaded conditions.

A feature of the invention also resides in the use of the spherical radial thrust bearings 138 to journal each crank arm on the frame 15 of the vehicle, as best shown in Fig. 10. While in some cases rubber frame journal bearings could be used to provide a similar action, for heavy loads it is desirable to provide the spherical friction bearings shown which require no lubrication due to the fact that the bearing surfaces engaged by the balls are made of a lubricant impregnated material. The primary purpose of these spherical radial thrust bearings is to accommodate the flexing of the crank arm 129.

Where loads as much as 18,000 pounds per axle are applied, a thrust, longitudinally of the chassis, of as much as 5,400 pounds from each axle and to the bearings 138 are encountered. To handle this thrust load without radius rods each of the bearings 138 is in the form of a ball journalled in a radial bearing and exerting thrust forces against the thrust bearing 139 inserted in the metal plug 140. The use of ball and socket bearings permits the lever arm 129 to twist under the heavy loads imposed upon it without misalinement of its bearings and also provides an economical and practical bearing for resisting the heavy longitudinal thrust forces which develop between the frame and axles of heavy vehicles.

A further feature of the rear end suspension resides in the use of the combined dirt seal, shock absorber and friction regulator or automatic bearing adjuster shown in Fig. 13 in the manner shown in Fig. 10 and which also allows the shackle bolts and nuts to be tightened to a predetermined metal-to-metal stop with reasonably broad machine tolerances for all metal parts.

In acting as a dirt seal, since the rubber is molded with the flutes 173 on one or both sides, a low initial rate of compression is established for any direction. After the flutes 173 have flattened out the compression rate jumps very high. This jump in the compression rate insures maintaining the dust seals at both ends of the pins 101 and 115 when the assembly is subjected to end thrusts. Thus when a heavy thrust load is applied to the rubber seal 170 at one end of the assembly, the opposite rubber seal 170 must expand a sufficient amount to insure against any opening from the pin bearings to the atmosphere. This expansion is insured by the high rate of compression encountered in the compressed rubber seal after its flutes have been flattened out.

Another important advantage of the flutes 173 on the rubber disks 170 is the fact that rubber, especially the present synthetic rubbers, takes a permanent set over a period of years of 40% or more. The flutes permit the assembly of the suspension with sufficient precompression on the rubber disks 170 to anticipate the permanent set and also to withstand the brake thrust reactions without heavy static thrust loads on the end bearings. The fluted design of the disks 170 makes the unit foolproof in assembly or reassembly because it is merely necessary to tighten the nuts of the shackle pins 101, 115 to a dead stop after which they are locked in place by the cotter pins.

In acting as shock absorbers, because of the precompression of the disks 170 a predetermined pressure is at all times imposed between the thrust bearings for the shackle pins 101, 115 and the shackle and axle brackets, respectively. Any substantial degree of rotation of the shackle bracket is thereby resisted by the friction imposed by the rubber disks 170. On the other hand with slight vibrations or movements of the shackle structures the rubber disks 170 will flex torsionally around the shackle pins before the resistance of the rubber is sufficient to cause action of the friction thrust bearings. By this means the vehicle is resiliently free from friction for the small irregularities in the road to provide a friction free boulevard ride, and at the same time the rubber disks 170 act to check frictionally movements caused by large irregularities.

A further feature of the invention resides in the use of the spherical radial thrust bearings 138 at the ends of the crank arms. Where flexing of these crank arms is encountered, it is desirable to use either rubber frame journal bearings or spherical friction bearings as shown. The vehicle shown is designed to accommodate loads of as much as 18,000 pounds per axle. This creates a thrust load, under brake reaction lengthwise of the frame, of as much as 5,400 pounds at each end of the axle. To handle such thrust load without radius rods the spherical bearings shown each has a thrust bearing 139 inserted in a metal plug 140. This provides a very practical, economical and readily adjustable means of handling the heavy longitudinal forces present in heavy duty vehicles without restorting to radius rods.

Another feature of the invention resides in the use of the torsion rods to eliminate thrust bearings. It will particularly be noted that the usual thrust bearings on the frame journal pivots have been eliminated and instead this thrust is transmitted to the anchored ends of the torsion rods. In setting up the suspension, for example the suspension shown in Figs. 1–7, the torsion rods have had holes jig drilled in their ovalled ends to fairly accurate dimensions between centers and are loosely anchored to the frame. These holes in the ovalled ends of the torsion rods are drilled at least $\frac{1}{16}$ inch over size of the pins or bolts which they receive. These oversize holes match up with holes in the ovalled sockets or receptacles 70, 78. The bolts or pins 74, 85 are snugly fitted in the holes in these ovalled sockets or receptacles 70, 78 but have a substantial clearance in the holes through the ovalled ends of the torsion rods so as to permit the ovalled ends of the torsion rods to rotate in their ovalled sockets a sufficient amount to effect anchorage in the ovalled sockets without any shearing action or force on the bolts or pins 74, 85. The frictional engagement between the ovalled ends of the torsion rods and the ovalled sockets of the socket members or receptacles provides the necessary resistance to end thrusts so as to transmit such end thrusts from the crank arms 34 to the anchorage for the torsion rods, no part of this end thrust being transmitted through the pins 74, 85. The purpose of these bolts or pins 74, 85 is merely to locate the axle during assembly and to insure against axle shift, under thrust forces, in case the entire sprung weight is momentarily tossed up sufficiently high to remove all downward pressure of the sprung portion of the vehicle against its unsprung portion. Thus as long as the sprung weight is partially supported on the unsprung portion of the vehicle the friction between the torsion rod ends and its sockets or receptacles 70, 78 is more than sufficient to insure the unsprung weight against shifting longitudinally of the vehicle, thereby to eliminate the necessity for thrust bearings in the frame journals. The pins 74, 85 only become effective against such thrusts when the unsprung weight of the vehicle is tossed so as to completely unload the unsprung portion thereof as when passing over a culvert at high speed. The advantage of eliminating thrust bearings for the frame journals is, of course, obvious.

From the foregoing it will be seen that the present invention provides a suspension, especially for heavy duty vehicles having a high percentage of load variation, having many operating advantages, particularly in the double variable linkage used at the rear end of the truck. The suspension also eliminates frame journal thrust bearings, provides a unique combined rubber dirt seal, shock absorber and automatic bearing adjuster and provides a unique bearing structure for the main crank arms which permits flexing and at the same time adequately withstand both radial and end thrust impacts.

I claim as my invention:

1. A vehicle spring suspension for connecting the frame and wheeled axle of a vehicle, comprising a normally generally horizontal crank arm fulcrumed on said frame on a generally horizontal axis extending transversely of said axle and free to move lengthwise of said axis, a shackle movably connecting the free end of said crank arm with said axle, and means for restraining rotative and axial movement of said crank arm relative to said frame, comprising a torsion rod having ends which are out-of-round in cross section and arranged generally in alinement with said axis, a socket member fast to the hub of said crank arm and having an oversize out-of-round socket fitting one out-of-round end of said torsion rod, an anchoring socket member fast to said frame and having an oversize out-of-round socket fitting the other out-of-round end of said torsion rod and means pinning each of said socket members to the corresponding end of said torsion rod.

2. A vehicle spring suspension for connecting the frame and wheeled axle of a vehicle, comprising a normally generally horizontal crank arm fulcrumed on said frame on a generally horizontal axis extending transversely of said axle and free to move lengthwise of said axis, a shackle movably connecting the free end of said crank arm with said axle, and means for restraining rotative and axial movement of said crank arm relative to said frame, comprising a torsion rod having ends which are out-of-round in cross section and arranged generally in alinement with said axis, a socket member fast to the hub of said crank arm and having an oversize out-of-round socket fitting one out-of-round end of said torsion rod, an anchoring socket member fast to said frame and having an oversize out-of-round socket fitting the other out-of-round end of said torsion rod and means pinning each of said socket members to the corresponding end of said torsion rod, and permitting a limited rotative movement of said torsion rod relative to said socket member.

3. A vehicle spring suspension for connecting the frame and wheeled axle of a vehicle, comprising a normally generally horizontal crank arm fulcrumed on said frame on a generally horizontal axis extending transversely of said axle and free to move lengthwise of said axis, a shackle movably connecting the free end of said crank arm with said axle, and means for restraining rotative and axial movement of said crank arm relative to said frame, comprising a torsion rod having ends which are out-of-round in cross section and arranged generally in alinement with said axis, a socket member fast to the hub of said crank arm and having an oversize out-of-round socket fitting one out-of-round end of said torsion rod, an anchoring socket member fast to said frame and having an oversize out-of-round socket fitting the other out-of-round end of said torsion rod and means pinning each of said socket members to the corresponding end of said torsion rod, and permitting a limited rotative and axial movement of said torsion rod relative to said socket member.

4. A vehicle spring suspension for connecting the frame and wheeled axle of a vehicle, comprising a normally generally horizontal crank arm fulcrumed on said frame on a generally horizontal axis extending transversely of said axle and free to move lengthwise of said axis, a shackle movably connecting the free end of said crank arm with said axle, and means for restraining rotative and axial movement of said crank arm relative to said frame, comprising a torsion rod having ends which are out-of-round in cross section and arranged generally in alinement with said axis, a socket member fast to the hub of said crank arm and having an oversize out-of-round socket fitting one out-of-round end of said torsion rod, an anchoring socket member fast to said frame and having an oversize out-of-round socket fitting the other out-of-round end of said torsion rod and means pinning each of said socket members to the corresponding end of said torsion rod, and permitting a limited rotative and axial movement of said torsion rod relative to said socket member comprising a cross pin snugly fitted in a hole in each socket member and extending into an oversized hole in said corresponding end of said torsion rod.

5. A vehicle spring suspension for connecting the frame and wheeled axle of a vehicle, comprising a normally generally horizontal crank arm having a hub fulcrumed on said frame on a generally horizontal axis extending transversely of said axle and free to move lengthwise of said axis, a shackle movably connecting the free end of said crank arm with said axle, a torsion rod having ends which are out-of-round in cross section and said torsion rod being arranged generally in alinement with said axis, a socket member fast to said hub of said crank arm and having an oversize out-of-round socket fitting one out-of-round end of said torsion rod, an anchoring socket member fast to said frame and having an oversize out-of-round socket fitting the other out-of-round end of said torsion rod, the friction of said out-of-round ends of said torsion rod normally preventing axial displacement of said hub, and a stop fast to said frame and in line with the end of said hub to further prevent axial displacement of said hub.

6. A vehicle spring suspension for connecting the frame and wheeled axle of a vehicle, comprising a normally generally horizontal crank arm having an elongated tubular hub, a pair of bearings for said tubular hub mounted in spaced relation on said frame and supporting said hub on a generally horizontal axis extending transversely of said axle, one of said bearings being arranged adjacent one end of said tubular hub, a shackle movably connecting the free end of said crank arm with said axle, a torsion rod having its live end extending through said one end of said tubular hub to the opposite end thereof, means operatively connecting the live end of said torsion rod to the said opposite end of said tubular hub, means anchoring the dead end of said torsion rod on said frame, a member fast to said one of said bearings, and a rubber sleeve carried by said member and engaging the adjacent portion of said torsion rod to prevent whipping thereof.

ALBERT F. HICKMAN.

REFERENCES CITED

The following references are of record in the file of this patent:

UNITED STATES PATENTS

| Number | Name | Date |
|---|---|---|
| 2,160,862 | Hickman | June 6, 1939 |
| 2,245,809 | Olley | June 17, 1941 |
| 2,256,069 | Wagner | Sept. 16, 1941 |
| 2,307,772 | Duffy | Jan. 12, 1943 |
| 2,328,868 | Weiss | Sept. 7, 1943 |
| 2,395,183 | Holmstrom et al. | Feb. 19, 1946 |
| 2,413,212 | Brown | Dec. 24, 1946 |
| 2,428,160 | Holmstrom et al. | Sept. 30, 1947 |